(12) United States Patent
Fujita

(10) Patent No.: US 8,634,774 B2
(45) Date of Patent: Jan. 21, 2014

(54) COMMUNICATION DEVICE AND CONTROL METHOD THEREOF

(75) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 906 days.

(21) Appl. No.: 12/769,349

(22) Filed: Apr. 28, 2010

(65) Prior Publication Data

US 2010/0297939 A1    Nov. 25, 2010

(30) Foreign Application Priority Data

May 19, 2009  (JP) ................................. 2009-121352
Apr. 9, 2010  (JP) ................................. 2010-090918

(51) Int. Cl.
*H04B 7/00*    (2006.01)

(52) U.S. Cl.
USPC ........................................ 455/41.2; 455/41.3

(58) Field of Classification Search
USPC ................ 455/41.2, 41.3, 3.01, 41.1, 7, 11.1, 455/13.1, 500, 566, 127.4, 456.1
See application file for complete search history.

(56) References Cited

U.S. PATENT DOCUMENTS 7,725,077 B2 *  5/2010  Jung et al. ..................... 455/41.2
8,160,568 B2 *  4/2012  Kim et al. ..................... 455/420

FOREIGN PATENT DOCUMENTS

JP    2006-031531    2/2006

* cited by examiner

*Primary Examiner* — Eugene Yun
(74) *Attorney, Agent, or Firm* — Cowan, Liebowitz & Latman, P.C.

(57) ABSTRACT

A communication device which communicates with an external device, comprises: a communication unit configured to communicate with the external device; a control unit configured to set the mode of the communication device to one of a plurality of modes including a communication mode in which the communication unit communicates with the external device, wherein, in accordance that the communication unit completes receipt of data from a first external device in the communication mode, the control unit inquires of a user as to whether or not to transmit the received data to a second external device in a state in which the communication device has been set to the communication mode.

18 Claims, 11 Drawing Sheets

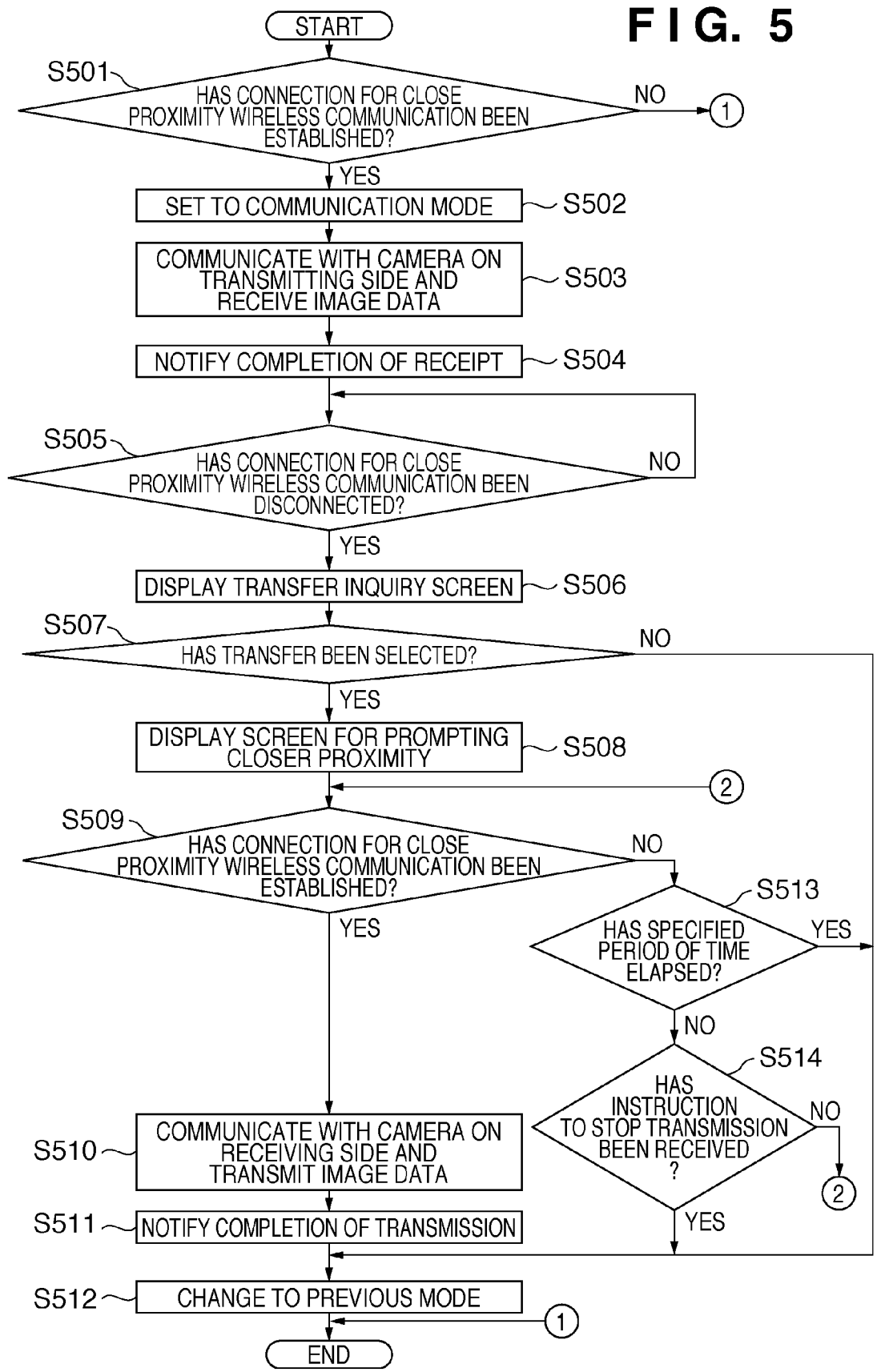

FIG. 7A

| No. | DATA NAME | NUMBER OF DATA TRANSFERS AVAILABLE |
|---|---|---|
| 1 | IMG_0001.JPG | 10 |
| 2 | IMG_0002.JPG | 10 |
| 3 | IMG_0004.JPG | 10 |
| 4 | IMG_0006.JPG | 10 |

FIG. 7B

| No. | DATA NAME | NUMBER OF DATA TRANSFERS AVAILABLE |
|---|---|---|
| 1 | IMG_0001.JPG | 9 |
| 2 | IMG_0002.JPG | 9 |
| 3 | IMG_0004.JPG | 9 |
| 4 | IMG_0006.JPG | 9 |

| DEVICE NAME | UNIQUE ID |
|---|---|
| DIGITAL CAMERA A | xyz |

| No. | DEVICE NAME | UNIQUE ID |
|---|---|---|
| 1 | DIGITAL VIDEO CAMERA A | abc |
| 2 | CELL PHONE A | opq |
| 3 | DIGITAL CAMERA C | ijk |
| 4 | DIGITAL CAMERA A | xyz |

| No. | DEVICE NAME | UNIQUE ID |
|---|---|---|
| 1 | DIGITAL VIDEO CAMERA A | abc |
| 2 | CELL PHONE A | opq |
| 3 | DIGITAL CAMERA C | ijk |
| 4 | DIGITAL CAMERA A | xyz |
| 5 | DIGITAL CAMERA B | efg |

COMMUNICATION DEVICE AND CONTROL METHOD THEREOF

BACKGROUND OF THE INVENTION

1. Field of the Invention

The present invention relates to a communication device that communicates with an external device and a method for controlling such a communication device.

2. Description of the Related Art

In recent years, not only personal computers, but also information devices such as digital still cameras (hereinafter referred to as "digital cameras") perform data transmission/reception via wireless communication. For wireless communication between information devices, a method that employs NFC (Near Field Communication) technology as typified by IC tags is used (for example, Japanese Patent Laid-Open No. 2006-031531).

However, Japanese Patent Laid-Open No. 2006-031531 employs P2P (peer-to-peer) communication. Accordingly, when the user of an information device wants to share data stored in the information device with a plurality of other information devices by transmitting the data via close proximity wireless communication, the user needs to bring his/her information device in close proximity to each of the information devices to transmit the data. In this case, the user has to repeatedly perform preparatory operations such as selecting content, which is extremely laborious and requires time.

SUMMARY OF THE INVENTION

The present invention has been conceived in view of the above problems, and the present invention realizes usability and fast operability for the user when transmitting data.

In order to solve the aforementioned problems, the present invention provides a communication device which communicates with an external device, comprises: a communication unit configured to communicate with the external device; a control unit configured to set the mode of the communication device to one of a plurality of modes including a communication mode in which the communication unit communicates with the external device, wherein, in accordance that the communication unit completes receipt of data from a first external device in the communication mode, the control unit inquires of a user as to whether or not to transmit the received data to a second external device in a state in which the communication device has been set to the communication mode.

The present invention also provides a communication device which communicates with an external device, comprising: a communication unit configured to communicate with the external device; and a control unit configured to set the mode of the communication device to one of a plurality of modes including a communication mode in which the communication unit communicates with the external device, wherein, in accordance that the communication unit completes receipt of a plurality of image files from the external device in the communication mode, the control unit inquires of a user as to whether or not to transmit the plurality of received image files to another external device in a state in which the communication device has been set to the communication mode.

The present invention also provides a control method of a communication device a method of controlling a communication device comprising a communication unit configured to communicate with an external device, wherein the communication unit has a plurality of modes including a communication mode for communicating with the external device, the method comprising: in accordance that receipt of data by the communication unit from a first external device in the communication mode is complete, inquiring of a user as to whether or not to transmit the received data to a second external device in a state in which the communication device has been set to the communication mode.

The present invention also provides a communication device which communicates with an external device, comprising: a communication unit configured to communicate with the external device; a mode setting unit configured to set a communication mode in which the communication unit communicates with the external device from among a plurality of modes; a selection unit configured to select data to be transmitted to the external device; and a control unit configured to control the communication unit to transmit the data selected by the selection unit to the external device, wherein, in accordance that the communication unit completes transmission of the selected data to the external device in the communication mode, the control unit inquires of a user as to whether or not to transmit the selected data to another external device in a state in which the communication device has been set to the communication mode.

The present invention also provides a method of controlling a communication device comprising a communication unit configured to communicate with an external device, a mode setting unit configured to set a communication mode in which the communication unit communicates with the external device from among a plurality of modes, and a selection unit configured to select data to be transmitted to the external device, the method comprising: in accordance that transmission of the selected data to the external device by the communication unit in the communication mode is complete, inquiring of a user as to whether or not to transmit the selected data to another external device in a state in which the communication device has been set to the communication mode.

According to the present invention, it is possible to realize usability and fast operability for the user.

Further features of the present invention will become apparent from the following description of exemplary embodiments with reference to the attached drawings.

BRIEF DESCRIPTION OF THE DRAWINGS

FIG. 5 is a flowchart illustrating a process performed by a digital camera according to Embodiment 1.

FIGS. 7A and 7B are diagrams showing examples of transfer permission information according to Embodiment 2.

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

System Configuration

Figure 1A:
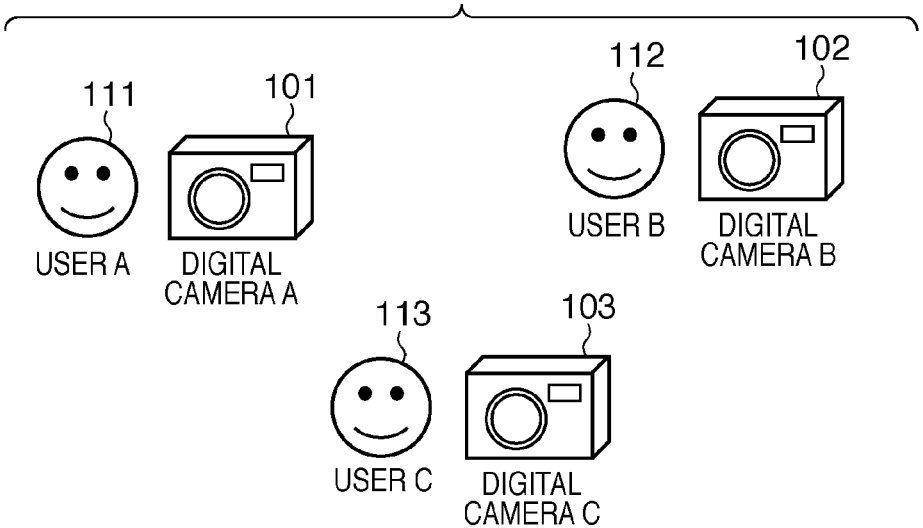
FIG. 1A is a system configuration diagram according to an embodiment of the present invention.

First, a configuration of a communication system in which digital cameras as communication devices of the present invention are applied will be described with reference to FIG. 1A. In FIG. 1A, reference numerals 101, 102 and 103 denote digital cameras. To distinguish them, 101 denotes a digital camera A, 102 denotes a digital camera B, and 103 denotes a digital camera C. In addition, when describing features that are common to the digital cameras A, B and C, the expression "digital camera (101, 102, 103)" is used. Reference numerals 111, 112 and 113 denote users of the digital cameras, and to distinguish them, 111 denotes a user A of the digital camera A 101, 112 denotes a user B of the digital camera B 102, and 113 denotes a user C of the digital camera C 103. In addition, when describing features that are common to the users A, B and C, the expression "user (111, 112, 113)" is used.

Each digital camera (101, 102, 103) has an interface for close proximity wireless communication, and is capable of P2P (peer-to-peer) data transmission/reception by being brought in close proximity to another digital camera by the user (111, 112, 113). As used herein, "close proximity wireless communication" means wireless communication based on communication protocols defined for a communication range of less than 1 m, in particular, less than several tens cm. As such communication protocols, "vicinity" contactless communication protocols for a communication range of approximately 70 cm or less and "close proximity" contactless communication protocols for a communication range of approximately 10 cm or less are known. Specifically, there are standards such as ISO/IEC 15693, ISO/IEC 14434 and ECMA-340 (ISO/IEC 18092).

Configuration of Digital Camera

Figure 1B:
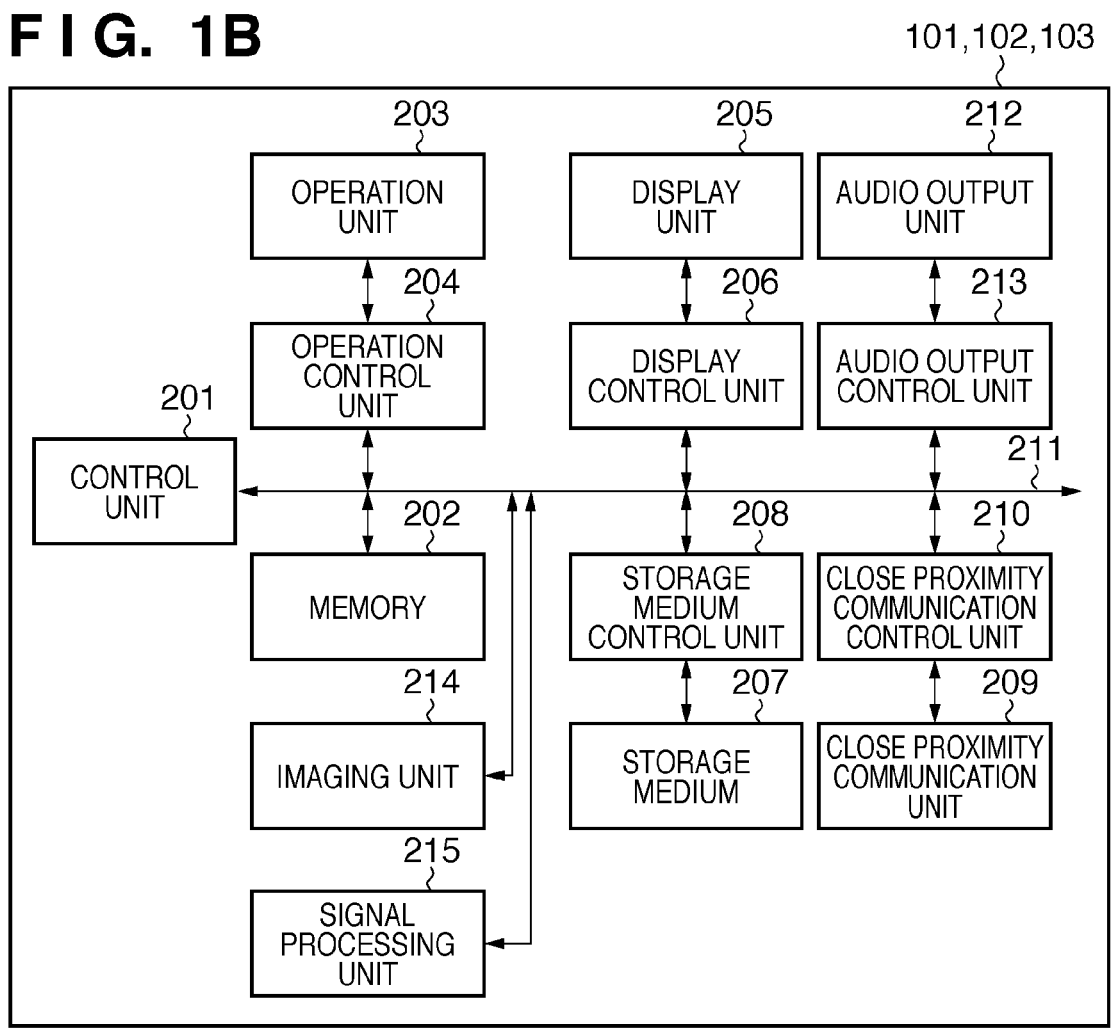
FIG. 1B is a block diagram of a digital camera as a communication device according to the embodiment of the present invention.

A configuration of the digital camera (101, 102, 103) of the present embodiment will be described next with reference to FIG. 1B. In FIG. 1B, a control unit 201 is a unit that controls the entire operations of the digital camera (101, 102, 103). The control unit 201 is made up of, for example, a CPU, a memory and so on. A memory 202 stores image data and a variety of data. The memory 202 is primarily used as an area for storing a variety of data, such as a storage area for storing a program executed by the control unit 201, a work area for a program being executed, and a storage area for storing screen data displayed on a display unit 205, which will be described later.

An operation unit 203 is made up of buttons, a cross keypad, a dial, a touch panel, and so on, and inputs instructions made by the user to the digital camera (101, 102, 103). The operation unit 203 has a power switch, a switch for capturing moving images or still images, a mode switch for switching between capturing mode and reproduction mode, a menu switch, and so on.

An operation control unit 204 notifies the control unit 201 of the instructions that are input through the operation unit 203. The display unit 205 is made up of, for example, a liquid crystal monitor, an organic EL display or the like, which displays operation screen data, image data and moving image data for the user. A display control unit 206 acquires operation screen data, image data and moving image data that are stored in the memory 202 or a storage medium 207, which will be described later, and displays such data on the display unit 205. The storage medium 207 is made up of, for example, a flash memory, a hard disk or the like, which stores a large amount of data such as image data and moving image data.

A storage medium control unit 208 reads and writes data from and to the storage medium 207. A close proximity communication unit 209 is an interface for close proximity wireless communication. In the present embodiment, by bringing the close proximity communication units 209 of the digital cameras (101, 102, 103) in close proximity to each other, the digital cameras (101, 102, 103) can communicate with each other. In addition, the close proximity communication unit 209 has a function of detecting connection and disconnection of close proximity wireless communication with an external device, and notifies the control unit 201 of an event when a connection to an external device or a disconnection from the external device is detected.

A close proximity communication control unit 210 transmits the data stored in the memory 202 or the storage medium 207 to an external device via the close proximity communication unit 209. The close proximity communication control unit 210 also stores data received from an external device via the close proximity communication unit 209 in the memory 202 or the storage medium 207.

An internal bus 211 transmits and receives data to and from the processing blocks shown in the drawing. An audio output unit 212 is made up of, for example, a speaker, which outputs an audio sound to inform the user. The audio output unit 212 is capable of, for example, when the close proximity communication unit 209 completes communication, informing the user of that fact, and thereby issuing a notification to prompt the user to disconnect the close proximity wireless communication.

An audio output control unit 213 transmits audio data to the audio output unit 212 and causes the audio output unit 212 to output an audio sound. In the present embodiment, the audio data that is output by the audio output unit 212 is assumed to have been stored in the memory 202 in advance. An imaging unit 214 captures images of a subject, and outputs still image data or moving image data. A signal processing unit 215 performs a specified signal process and a coding process in accordance with a known compression coding scheme on the still image data or moving image data that is output from the imaging unit 214 when capturing images. When reproducing images, the signal processing unit 215 decodes still image data or moving image data reproduced from the storage medium 207.

It should be noted that the processing blocks described above are illustrated as an example of the communication device of the present invention, and the present invention is not limited thereto.

Capturing Process

Next, a basic capturing process of the digital camera (101, 102, 103) will be described.

When the user operates the operation unit 203 to turn on power, the digital camera (101, 102, 103) enters a capturing mode, where moving image data of a subject captured by the imaging unit 214 is output and the camera enters a waiting state for capturing images. The moving image data output from the imaging unit 214 is transmitted to the display control unit 206. The display control unit 206 displays the moving image data output from the imaging unit 214 on the display unit 205. The user can check the subject images displayed on the display unit 205, and operate the operation unit 203 to instruct the camera to capture images.

When the user instructs the camera to capture a still image by means of the operation unit 203, the control unit 201 controls the imaging unit 214 so as to capture one frame's worth of still image data in accordance with the capture instruction and to output the data. The signal processing unit 215 processes the still image data obtained by the imaging unit 214, performs a known coding process such as JPEG on the data, and outputs the data to the storage medium control unit 208. The storage medium control unit 208 creates a still image file containing the coded still image data, and records the file in the storage medium 207.

In the waiting state for capturing images, when the user instructs the camera to start capturing moving images by means of the operation unit 203, the control unit 201 controls the signal processing unit 215 so as to process the moving image data obtained by the imaging unit 214, and start a known coding process such as MPEG on the data. Then, the moving image data output from the signal processing unit 215 is output to the storage medium control unit 208. The storage medium control unit 208 creates a moving image file containing the coded moving image data, and records the data in the storage medium 207. In addition, when the user instructs the camera to stop recording moving images, the control unit 201 instructs the signal processing unit 215 to stop the coding process, and instructs the storage medium control unit 208 to stop recording moving images. In the present embodiment, the image data recorded from the issuance of an instruction to start recording moving images until the issuance of an instruction to stop recording is stored in a single moving image file.

In the present embodiment, when still images or moving images are captured, thumbnail images are created, stored and recorded in each file. The signal processing unit 215 produces thumbnail image data by using the stored image data.

Reproduction Process

Next, a basic reproduction process of the digital camera (101, 102, 103) will be described.

When the user operates the operation unit 203 to instruct the camera to switch to a reproduction mode, the control unit 201 sets the digital camera (101, 102, 103) to a reproduction mode. Then, the control unit 201 controls the storage medium control unit 208 so as to read a still image file or moving image file recorded in the storage medium 207. In the case where the user has instructed the camera to reproduce still images, the storage medium control unit 208 transmits the still image data contained in the still image file read from the storage medium 207 to the signal processing unit 215. The signal processing unit 215 decodes the reproduced still image data, and transmits the data to the display control unit 206. The display control unit 206 changes the size of the reproduced still image data to a size suitable for the display unit 205, and displays the data on the display unit 205.

In the case where the user has instructed the camera to reproduce moving images, the storage medium control unit 208 transmits the moving image data contained in the moving image file read from the storage medium 207 to the signal processing unit 215. The signal processing unit 215 decodes the reproduced moving image data, and transmits the data to the display control unit 206. The display control unit 206 changes the size of the reproduced moving image data to a size suitable for the display unit 205, and displays the data on the display unit 205.

In the present embodiment, in such reproduction modes, the camera has a function to display a plurality of thumbnail images of image data stored in the storage medium 207 on a screen of the display unit 205. When the user operates the operation unit 203 to instruct the camera to display thumbnails, the control unit 201 controls the storage medium control unit 208 so as to reproduce the thumbnail data of the still image file or moving image file. The storage medium control unit 208 transmits the reproduced thumbnail image data to the display control unit 206. The display control unit 206 produces a thumbnail list screen based on the data regarding a plurality of thumbnails, and displays the thumbnails on the display unit 205. The user can operate the operation unit 203 to select a thumbnail displayed on the display unit 205 and to issue an instruction to reproduce the selected thumbnail. In response to such a reproduction instruction, the control unit 201 controls each unit so as to reproduce a still image file corresponding to the selected and instructed thumbnail in the manner described above.

Communication Process by Digital Camera

Next, a process to transmit and receive data according to the present embodiment will be described.

Figure 2:
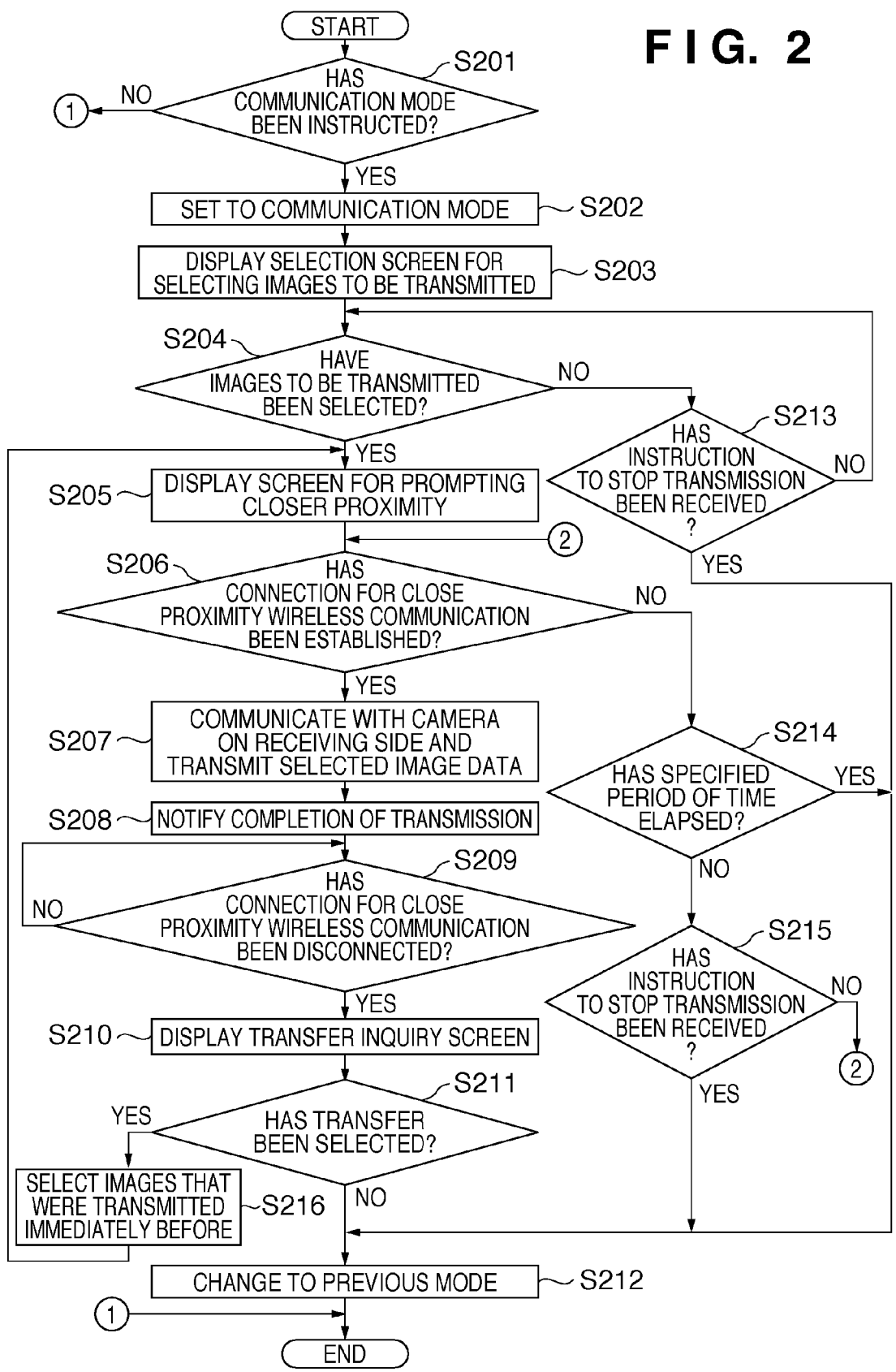
FIG. 2 is a flowchart illustrating a transmission process according to the embodiment of the present invention.

FIG. 2 is a flowchart illustrating a process for transmitting image data performed by the digital camera (101, 102, 103). The control unit 201 controlling each unit implements the process of FIG. 2.

First, whether or not a communication mode has been set is determined (S201). In the present embodiment, the user can set the communication mode by, in the state of the capturing mode or reproduction mode, operating the operation unit 203 to display a menu screen on the display unit 205 for mode setting, and using the menu screen. If a communication mode is set, the control unit 201 sets the camera to a communication mode (S202). In the present embodiment, "communication mode" refers to a mode for performing data communication with an external device such as another digital camera via the close proximity communication unit 209. If a communication mode is set, the control unit 201 sets the camera to a communication mode, and instructs the close proximity communication control unit 210 to prepare for wireless communication.

Figure 4A:
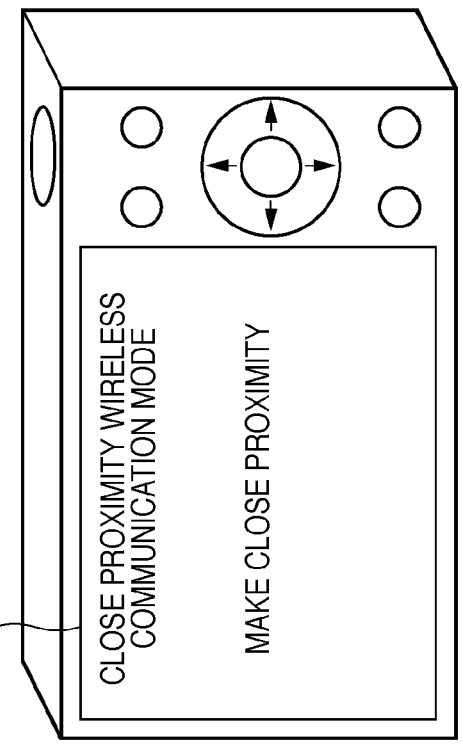
FIGS. 4A to 4D are diagrams showing a display screen according to the embodiment of the present invention.

Next, the control unit 201 instructs the display control unit 206 to display a selection screen for allowing the user to select an image to be transmitted on the display unit 205 (S203). FIG. 4A shows an example of a selection screen 401. The user can select data to be transmitted to an external device from among a plurality of still images and moving images stored in the storage medium 207 by using this selection screen and operating the operation unit 203.

When the selection screen has been displayed, the control unit 201 determines whether or not an image to be transmitted has been selected (S204). If no image to be transmitted is selected and the user issues an instruction to stop transmission through the operation of the operation unit 203 (S213), the control unit 201 changes the mode of the camera to the mode before switching to the communication mode and ends the process (S212).

Figure 4B:
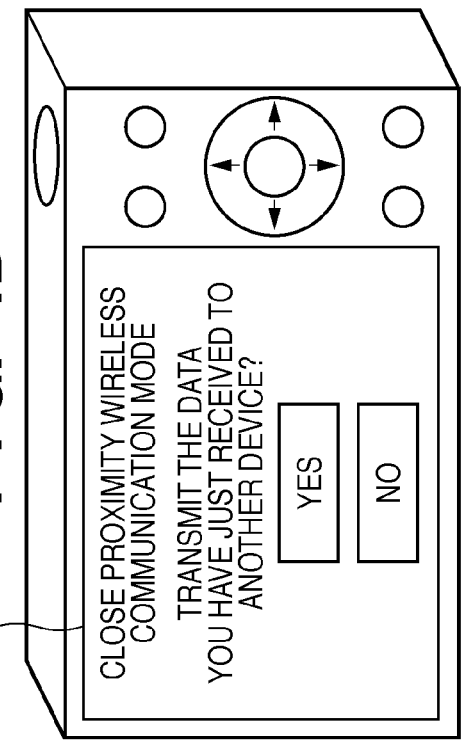

If, on the other hand, an image to be transmitted is selected in S204, the control unit 201 generates a transmission schedule list representing the selected image data (still image file and/or moving image file) and stores it in the memory 202. The control unit 201 also instructs the display control unit 206 to display a screen for prompting closer proximity to a camera on the receiving side on the display unit 205 (S205). FIG. 4B shows a screen 402 displayed at this time.

In this state, the control unit 201 waits for receipt of a notification indicating that a connection for close proximity wireless communication has been established with an external device from the close proximity communication control unit 210 (S206). Specifically, it is detected that the close proximity communication unit 209 of the camera on the transmitting side and the close proximity communication unit 209 of the camera on the receiving side have been brought in close proximity to each other, and that they are in a state capable of communication with each other. If a connection for wireless communication is not established, and a specified period of time has elapsed (S214) since the screen for prompting closer proximity is displayed in S205, the control unit 201 automatically changes the mode of the camera to the mode before switching to the communication mode and ends the process (S212). If, on the other hand, an instruction to stop transmission is issued by the user before a specified period of time has elapsed in S214 (S215), the control unit 201 changes the mode of the camera to the mode before switching to the communication mode and ends the process (S212).

If, on the other hand, the control unit 201 receives a notification indicating that communication has been established in S206, the control unit 201 instructs the close proximity communication control unit 210 to start communication with the camera on the receiving side and transmit the image data (S207). Specifically, first, the close proximity communication unit 209 transmits a transmission request message. The transmission request message includes information to request data transmission and information regarding image data to be transmitted. As used herein, "information regarding image data" can be, for example, file name, file size and so on. Subsequent to the transmission request message, based on the transmission schedule list stored in the memory 202, files of the selected image data are sequentially read from the storage medium 207 by the storage medium control unit 208, and transmitted to the camera on the receiving side by the close proximity communication unit 209. Then, when all of the selected image data have been transmitted, the control unit 201 displays information indicating completion of data transmission on the display unit 205, and outputs an audio sound from the audio output unit 212 (S208). The control unit 201 then waits for a notification indicating that the close proximity connection has been disconnected from the close proximity communication unit 209 (S209).

Figure 4C:
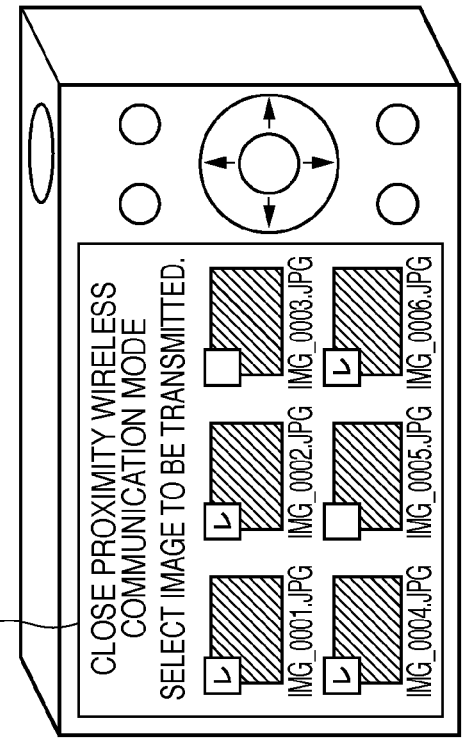

If the control unit 201 receives a disconnection notification from the close proximity communication unit 209, the control unit 201 controls the display control unit 206 to display, on the display unit 205, an inquiry screen for inquiring of the user as to whether or not to transmit the images that were transmitted immediately before to a device other than the external device to which the images were transmitted immediately before while maintaining the communication mode (S210). FIG. 4C shows an inquiry screen 403 displayed at this time.

When the inquiry screen has been displayed, the user operates the operation unit 203 to select whether to transfer the data. As a result of the inquiry, if the user selects to not transfer the data, the control unit 201 changes the mode of the camera to the mode before switching to the communication mode (S212). If, on the other hand, the user selects to transfer the data, the images that were transmitted immediately before are selected again as images to be transmitted, and the control unit returns to S205 (S216).

Next, a process for receiving image data will be described. FIG. 5 is a flowchart illustrating a process for receiving image data performed by the digital camera (101, 102, 103). The control unit 201 controlling each unit implements the process of FIG. 5.

When receiving image data from an external device in the present embodiment, if the close proximity communication unit 209 detects that the close proximity communication unit of an external device is in close proximity, the close proximity communication control unit 210 notifies the control unit 201 of that fact. Upon detecting that an external device is in close proximity, the close proximity communication control unit 210 automatically starts a process for establishing a connection for close proximity wireless communication. Next, the control unit 201 waits for a notification indicating that a connection via close proximity wireless communication has been established from the close proximity communication control unit 210 (S501). In response to the connection notification from the close proximity communication unit 209, the control unit 201 automatically changes the mode of the camera to a communication mode (S502). At this time, if the camera is in the capturing mode, the camera automatically changes to the communication mode while it is in a waiting state for capturing images. If the camera is capturing still images or moving images, the camera continuously captures images without changing to the communication mode. If the camera is in the reproduction mode, the control unit 201 automatically changes the mode to the communication mode. In this case, the mode is changed to the communication mode even if the camera is reproducing moving images or still images.

Next, the control unit 201 communicates with the camera on the transmitting side and receives image data via the close proximity communication unit 209 (S503). Specifically, the close proximity communication unit 209 receives a transmission request message transmitted from the camera on the transmitting side. As described above, the transmission request message includes information to request data transmission and information regarding image data to be transmitted. As used herein, "information regarding image data" can be, for example, file name, file size and so on. Subsequently, the close proximity communication unit 209 receives image data. The control unit 201 sequentially records received image data in the storage medium 207.

After all of the image data have been received, the control unit 201 outputs a sound for notifying the user of completion of the communication from the audio output unit 212, and displays information indicating that the receipt of image data has been complete on the display unit 205 (S504). Then, the control unit 201 waits for a notification indicating that the connection for close proximity wireless communication has been disconnected from the close proximity communication unit 209 (S505).

Figure 4D:
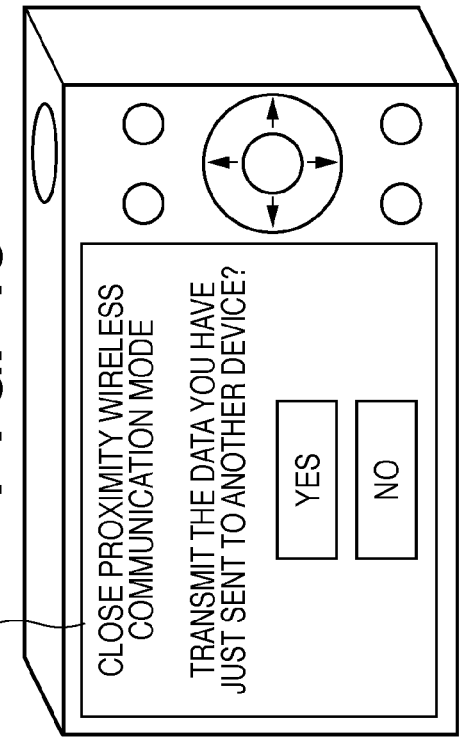

If the control unit 201 receives a disconnection notification from the close proximity communication unit 209, the control unit 201 displays, on the display unit 205, a screen for inquiring of the user as to whether or not to transfer the image data received this time to another device while maintaining the mode of the camera in the communication mode (S506). FIG. 4D shows an inquiry screen 404 displayed at this time.

If the control unit 201 receives an instruction to not transfer the data from the user after the inquiry screen has been displayed, the control unit 201 changes the mode of the camera to the mode before switching to the communication mode and ends the process (S512).

If, on the other hand, the user selects to transfer the data, the control unit 201 instructs the display control unit 206 to display, on the display unit 205, a screen for prompting closer proximity to a camera on the receiving side (S508). FIG. 4B shows a screen 402 displayed at this time.

In this state, the control unit 201 waits for receipt of a notification indicating that a connection for close proximity wireless communication has been established with the external device from the close proximity communication control unit 210 (S509). If a connection for wireless communication is not established, and a specified period of time has elapsed (S513) since the screen for prompting closer proximity is displayed in S506, the control unit 201 automatically changes the mode of the camera to the mode before switching to the communication mode and ends the process (S512). If, on the other hand, an instruction to stop transmission is issued by the user before a specified period of time has elapsed in S513 (S514), the control unit 201 changes the mode of the camera to the mode before switching to the communication mode and ends the process (S512).

If, on the other hand, a notification indicating that communication has been established is received in S509, the control unit 201 instructs the close proximity communication control unit 210 to start communication with the camera on the receiving side and transmit the image data (S510). Specifically, a transmission request message is transmitted via the close proximity communication unit 209 in the same manner as described above, and then, the image data that was received in S503 and stored in the storage medium 207 this time is sequentially read from the storage medium 207, and transmitted to the camera on the receiving side via the close proximity communication unit 209. When all of the image data have been transmitted, the control unit 201 displays information indicating completion of data transmission on the display unit 205, and outputs an audio sound from the audio output unit 212 (S511). Then, the control unit 201 changes the mode of the camera to the mode before switching to the communication mode and ends the process (S512).

Figure 3:
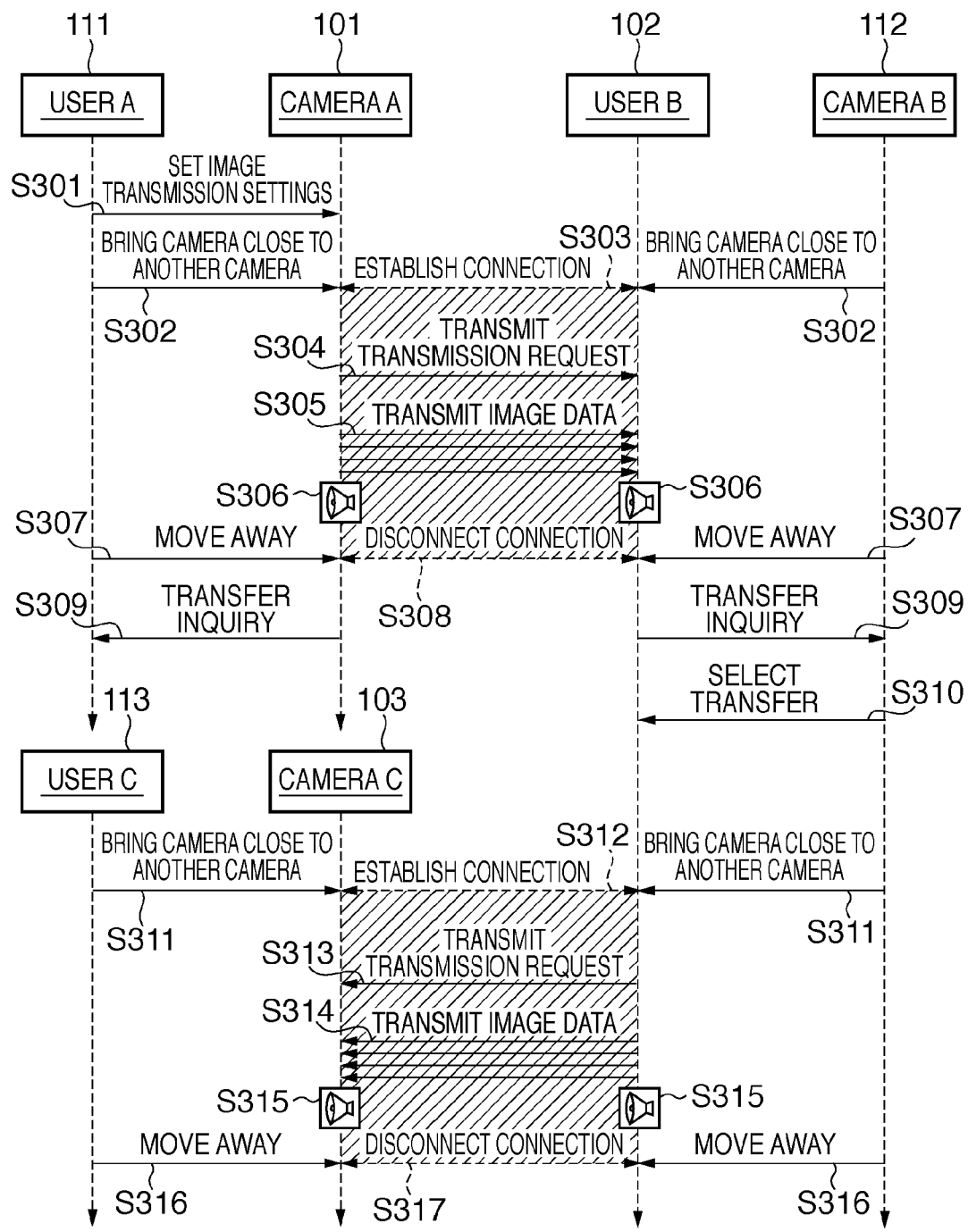
FIG. 3 is a sequence diagram of a transfer process according to the embodiment of the present invention.

Next, a process in which the digital camera B 102 transfers image data to the digital camera C 103 after the digital camera B 102 has received the image data from the digital camera A 101 will be described with reference to FIG. 3. In FIG. 3, the digital camera A 101 executes the process shown in FIG. 2, and the digital camera B 102 and the digital camera C 103 execute the process shown in FIG. 5.

In S301, the user A 111 operates the digital camera A 101 to set the digital camera A 101 to a communication mode for transmitting images via close proximity wireless communication. After the communication mode has been set, for example, the user A 111 operates the menu screen of the digital camera A 101 to select image data to be transmitted in the same manner as described above.

FIG. 4A shows the selection screen 401 displayed at this time. In FIG. 4A, thumbnail images of the image data stored in the storage medium 207 are displayed. Then, the user selects images to be transmitted while viewing the displayed thumbnail images. In FIG. 4A, IMG 0001.JPG, IMG 0002.JPG, IMG 0004.JPG and IMG 0006.JPG have been selected as images to be transmitted. It is assumed in the following description that these four images have been selected as image data to be transmitted.

When images to be transmitted have been selected by the user A 111, the digital camera A 101 displays, on the display unit 205, a screen for prompting the user to establish a close proximity connection with a device as a transmission destination as shown in FIG. 4B.

In S302, the digital camera A 101 and the digital camera B 102 are brought close to each other by the user A 111 and the user B 112. In S303, the close proximity communication unit 209 of the digital camera A 101 and the close proximity communication unit 209 of the digital camera B 102 detect establishment of a connection for close proximity wireless communication. If the digital camera B 102 detects, in S303, that the digital camera A 101 is in close proximity, the digital camera B 102 changes to a communication mode. In S304, the digital camera A 101 transmits a transmission request message requesting to transmit the images selected in S301 to the digital camera B 102. The transmission request message includes, for example, the file name, file size and the like of the images selected in S301 as information regarding images to be transmitted.

In S305, the digital camera A 101 reads image files designated in the transmission request message transmitted in S304 from the storage medium 207, and transmits the files to the digital camera B 102.

When the transmission and reception process of the image data ends, in S306, sounds notifying the users of completion of communication are output by the audio output unit 212 of the digital camera A 101 and the audio output unit 212 of the digital camera B 102.

In S307, the user A 111 and the user B 112 move the digital camera A 101 and the digital camera B 102 away from each other. In S308, the close proximity communication unit 209 of the digital camera A 101 and the close proximity communication unit 209 of the digital camera B 102 detect a disconnection of the connection for close proximity wireless communication. In S309, the digital camera A 101 and the digital camera B 102 automatically display, on their respective display units 205, a screen for inquiring as to whether or not to transfer the image data transmitted or received in S305 to another device, and receives an instruction from their respective users. The inquiry screen 403 shown in FIG. 4C is displayed on the display unit 205 of the digital camera A 101. Likewise, the inquiry screen 404 shown in FIG. 4D is displayed on the display unit 205 of the digital camera B 102.

In S310, the user B 112 selects a transfer process via the operation unit 203 of the digital camera B 102. The transfer process is selected by, for example, the user operating the operation unit 203 and selecting "Yes" button while viewing the inquiry screen of FIG. 4D. Thus, the digital camera B 102 automatically selects the image data received in S305 (four image files in this case) as images to be transmitted while maintaining the communication mode. Then, the digital camera B 102 displays the display screen 402 of FIG. 4B on the display unit 205, and waits for a camera as a transmission destination (the digital camera C 103 in this case) to be brought in close proximity.

In S311, the digital camera B 102 and the digital camera C 103 are brought close to each other by the user B 112 and the user C 113. In S312, the close proximity communication unit 209 of the digital camera B 102 and the close proximity communication unit 209 of the digital camera C 103 detect establishment of a connection for close proximity wireless communication. If the digital camera C 103 detects that the digital camera B 102 is in close proximity, the digital camera C 103 changes to a communication mode. In S313, a transmission request message requesting to transmit the images selected in S310 is transmitted to the digital camera C 103. The transmission request message includes file name, file size and so on as information regarding images to be transmitted. In S314, the digital camera B 102 transmits the image data corresponding to the transmission request message transmitted in S313 to the digital camera C 103.

When the transmission and reception process of the image data ends, in S315, sounds notifying the users of completion of communication are output by the audio output unit 212 of the digital camera B 102 and the audio output unit 212 of the digital camera C 103. In S316, the the user B112 and the user C 113 move digital camera B 102 and the digital camera C 103 away from each other. When the connection with the digital camera C 103 has been disconnected, the digital camera B 102 switches from the communication mode to the previous mode. In S317, the close proximity communication unit 209 of the digital camera B 102 and the close proximity communication unit 209 of the digital camera C 103 detect a disconnection of the connection for close proximity wireless communication.

In the manner described above, the user can transfer received images to another camera only by issuing a transfer instruction through the inquiry screen displayed when receiving image data, without having to again select images to be transmitted.

In S309, the inquiry screen 403 shown in FIG. 4C is displayed on the digital camera A 101. If the user A 111 selects to transmit the transmitted data to another device, the digital camera A 101 selects the images that were transmitted immediately before as candidate images to be transmitted. Then, the digital camera A 101 again displays the screen 402 of FIG. 4B on the display unit 205 and waits for a camera as a transmission destination to be brought in close proximity while maintaining the communication mode.

In addition, in S306 and S315, both cameras on the transmitting side and the receiving side notify the users of completion of communication, but the configuration is not limited thereto, and it is also possible to employ a configuration in which only either one of the digital cameras performs such notification via the audio output unit 212.

In addition, the above sequence has been described in the context of the users A, B and C being three different persons, but they are not necessarily three different persons, and it is possible for the users to be the same user, for example.

The camera mode is not returned to the mode before switching to the communication mode when the transmission is not selected in step 211 of FIG. 2 but the process may return to step 203 while the communication mode is being set and newly display the selection screen for allowing the user to select the image to be transmitted.

Also, the process of FIG. 5 is not started if it is detected that the external device is brought in close proximity by the wireless communication unit of the camera on the receiving side but may be started if it is detected that the external device is brought in close proximity while the communication mode is being set in the same manner at the transmission.

In this case, the camera on the receiving side does not automatically switch to the communication mode even if the external device is brought in close proximity in a mode other than the communication mode. When the user sets to the communication mode, the camera is set to the communication mode and the selection screen is displayed in the same manner in the process of steps 201 to 203. In this state, the process of FIG. 5 is started if the external device is brought in close proximity while the image is not selected.

As described above, since the user sets to the communication mode at the reception of the image, it can prevent the image from transmitting in the timing when the user of the camera on the receiving side will not desire.

Embodiment 2

Embodiment 2 will be described next.

In the present embodiment, when transmitting image data, transfer permission information that indicates whether or not image data can be further transmitted from a transmission destination device to another device is transmitted. When a device on the receiving side receives image data and transfer permission information from an external device, the device on the receiving side executes a process for transferring the data to another external device according to the transfer permission information. The system configuration and the configuration of the digital camera (101, 102, 103) of the present embodiment are the same as those of Embodiment 1, so a description thereof is omitted here.

In the present embodiment, the user can set whether or not to permit transmission from the device as a transmission destination to another device for each image data stored in the storage medium 207 by operating the operation unit 203. In the present embodiment, as a default value, a value indicating permission for data transfer is set and recorded as transfer permission information immediately after capturing an image. Then, if a setting is set by the user to prohibit data transfer or restrict the number of data transfers, a value indicating the setting is set as transfer permission information. Specifically, whether or not to prohibit data transfer is set. If a setting to prohibit data transfer is not set, the number of times to permit data transfer is further set. If the number of times to permit data transfer is set to an infinite value, that setting is set as transfer permission information.

Figure 6:
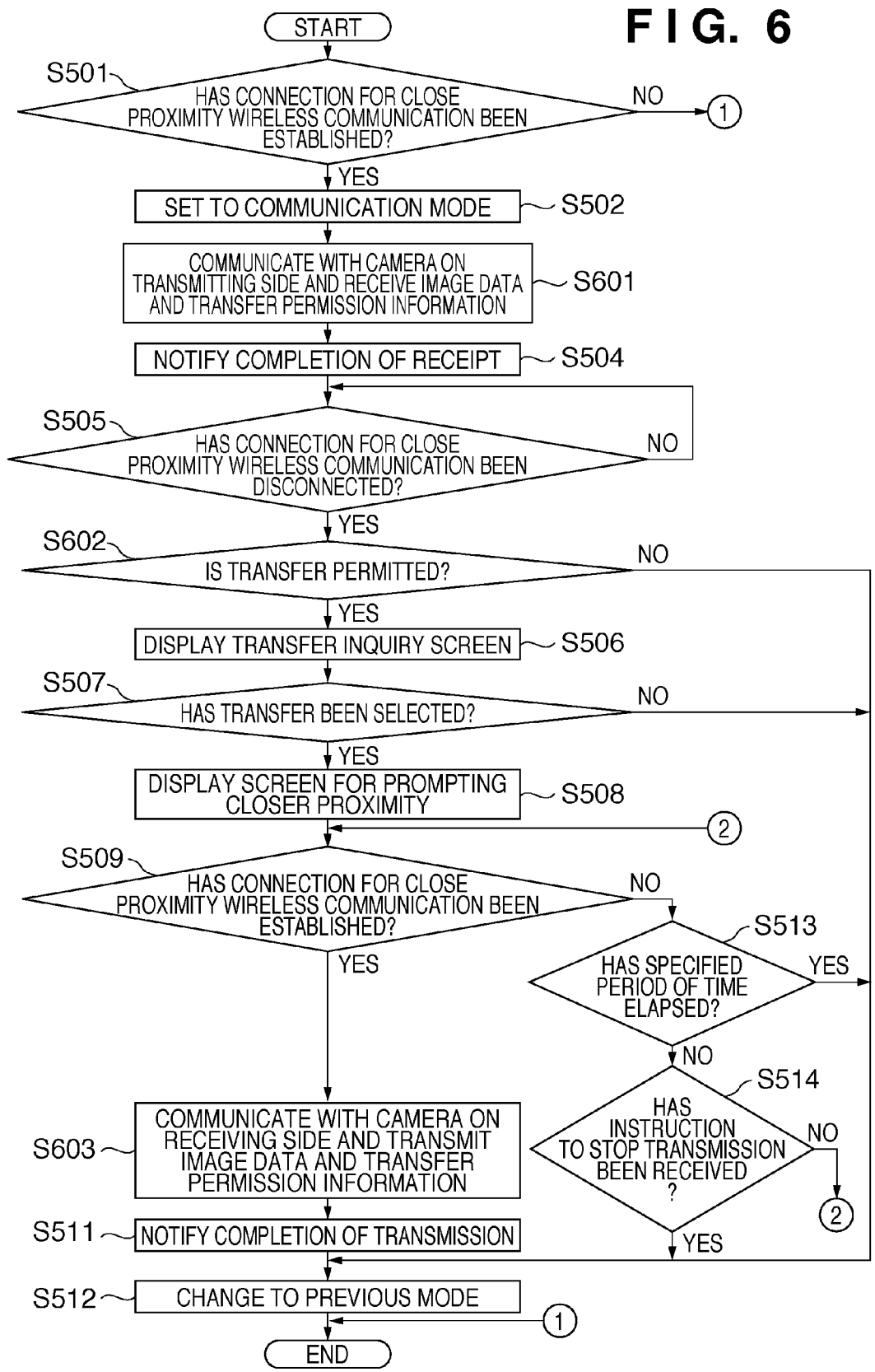
FIG. 6 is a flowchart illustrating a process performed by a digital camera according to Embodiment 2.

FIG. 6 is a flowchart illustrating a receiving process performed by the digital camera (101, 102, 103). The process of FIG. 6 is implemented by the control unit 201 controlling each unit. In FIG. 6, the same processes as those of FIG. 5 are given the same reference numerals as in FIG. 5, and a description thereof is omitted here.

As shown in FIG. 6, if a connection for close proximity communication with a camera on the transmitting side is established (YES in S501), the control unit 201 sets the camera to a communication mode (S502). Then, the control unit 201 receives image data and transfer permission information regarding the image data from the external device via the close proximity communication unit 209 (S601). The transfer permission information is information indicating whether or not the image data designated in the received transmission request message as an image to be transmitted can be transferred to another external device. FIG. 7A shows such transfer permission information, in which "No." shows a numerical value indicating the number of image data, "Data Name" shows a file name, and "Number of Data Transfers Available" shows a numerical value indicating the number of remaining times that image data can be transferred. For example, for IMG_0001.JPG, it is shown that the number of remaining times that image data can be transferred is 10. The control unit 201 stores the received transfer permission information in the memory 202.

When the communication is disconnected after the image data and the transfer permission information have been received in the manner as described above, in S601, the control unit 201 reads the transfer permission information stored in the memory 202, and determines for all of the received image data whether or not to transfer image data to another external device (S602). In the present embodiment, when "Number of Data Transfers Available" shown in FIG. 7A is 1 or more, it is determined that data transfer is possible. When "Number of Data Transfers Available" is less than 1 (or in other words, 0), it is determined that data transfer is prohibited. If data for which transfer is possible is present in all of the received image data, the image data for which transfer is permitted is automatically selected as the next image to be transmitted, and the inquiry screen 404 shown in FIG. 4D is displayed on the display unit 205 (S506). If all of the received image data are prohibited from being transferred, the process ends.

If the user selects to transfer the data after the inquiry screen has been displayed, the control unit 201 displays a screen for prompting closer proximity on the display unit 205, and waits for a camera as a transfer destination to be brought in close proximity. Then, if a connection for close proximity communication is established, the control unit 201 transmits, via the close proximity communication unit 209, the image data for which transfer is permitted that was selected in S506 and transfer permission information regarding the image data to the external device (S603). At this time, in the present embodiment, the control unit 201 reduces the value for the number of data transfers available of the image data to be transferred by one. FIG. 7B shows an example of the transfer permission information transmitted in S603. In FIG. 7B, the value for the number of data transfers available of each image data, which was 10 in FIG. 7A, has been reduced by one to 9. If the value set as transfer permission information is a specified value indicating an infinite number of data transfers, the data is transmitted with the specified value without changing the value for the number of data transfers available.

In the manner described above, according to the present embodiment, the number of data transfers available can be set when transmitting image data. Accordingly, it is possible to prevent images to be unrestrictedly transferred from a camera as a transfer destination.

Embodiment 3

Embodiment 3 will be described next.

In the present embodiment, when, as a result of an inquiry inquiring of the user as to transfer received image data that is made when image data has been received, an instruction to transfer the data is issued, if an external device brought in close proximity is the transmission source of the image data, transfer of the image data is prohibited.

Figure 8:
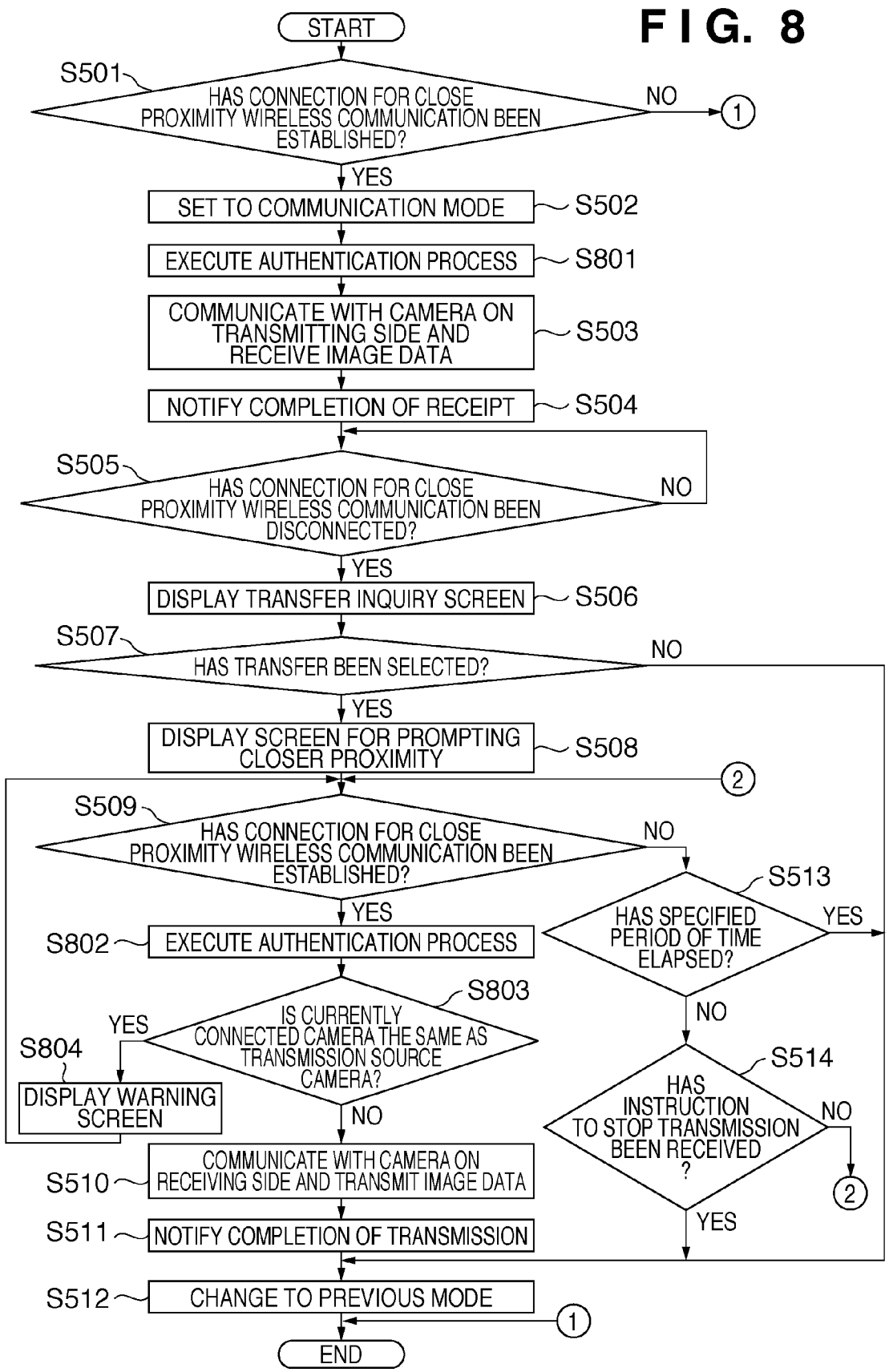
FIG. 8 is a flowchart illustrating a process performed by a digital camera according to Embodiment 3.

The system configuration and the configuration of the digital camera (101, 102, 103) of the present embodiment are the same as those of Embodiment 1, so a description thereof is omitted here. FIG. 8 is a flowchart illustrating a receiving process performed by the digital camera (101, 102, 103). The control unit 201 controlling each unit implements the process of FIG. 8. In FIG. 8, the same processes as those of FIG. 5 are given the same reference numerals as in FIG. 5, and a description thereof is omitted here.

Figures 9A, 9B:
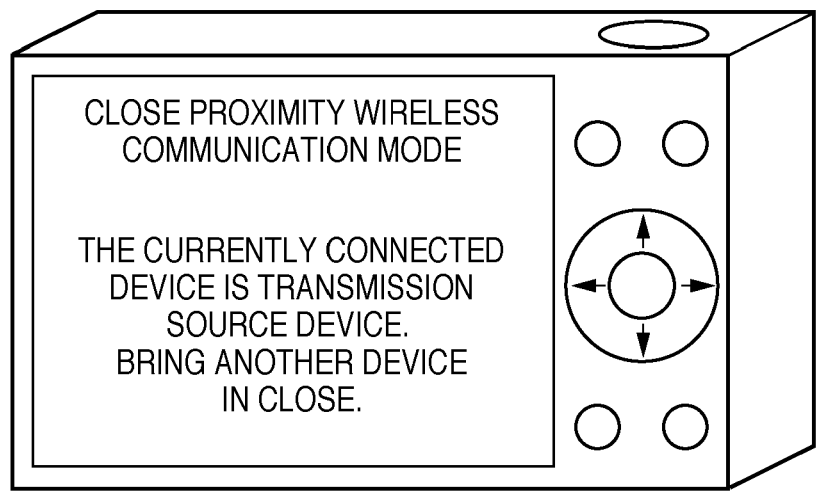
FIGS. 9A and 9B are diagrams showing examples of information regarding device authentication and a warning screen according to Embodiment 3.

As shown in FIG. 8, if a connection for close proximity communication with a camera on the transmitting side is established (YES in S501), the control unit 201 sets the camera to a communication mode (S502). Then, the control unit 201 executes a device authentication process by using the close proximity communication unit 209 (S801). Here, the control unit 201 receives identification information of the external device on the image data transmitting side, and at the same time, transmits its own identification information to the external device on the transmitting side. In the present embodiment, as device identification information, device name and unique ID are exchanged between the device on the transmitting side and the device on the receiving side. FIG. 9A shows a device name and a unique ID acquired from the external device on the transmitting side. In FIG. 9A, the device name indicates the name of an external device, and the unique ID is identification information for uniquely identifying an external device. The received identification information is stored in the memory 202.

After the identification information has been received from the external device in this manner, the image data is received in the manner described above. Then, upon completion of receipt, the inquiry screen of FIG. 4D is displayed on the display unit 205, and if a transfer instruction is issued, the received image data is selected as images to be transmitted, and the display screen 402 of FIG. 4B is displayed on the display unit 205.

In this state, if an external device is brought in close proximity and a connection for close proximity communication is established, the control unit 201 executes the same device authentication process as in S801 (S802). Then, the control unit 201 compares the identification information acquired from a second external device in the device authentication process performed in S802 with the identification information acquired from a first external device in the device authentication process performed in S801. Then, the control unit 201 determines, based on the result of comparison, whether or not the currently connected external device matches the camera that is the transmission source of the candidate image data to be transmitted (S803). If it is determined that the currently connected external device matches the transmission source camera, the control unit 201 displays, on the display unit 205, a warning screen indicating that the external device with which the close proximity connection has been established in S509 is the transmission source of the data received in S503 (S804). Then, the control unit 201 returns to S509, and again waits for establishment of a close proximity connection with another external device. FIG. 9B shows an example of the warning screen displayed in S804.

If, on the other hand, the external device that was brought in close proximity in S509 is a different device from the transmission source camera of the image data, the image data is transmitted in the manner as described above.

In this manner, according to the present embodiment, while the camera is in a waiting state for a close proximity connection in order to transmit image data received from an external device to another external device, if the camera establishes a close proximity connection with the external device that is the transmission source of the image data, a warning is issued to the user, whereby it is possible to avoid unnecessary transfer process.

In the present embodiment, in S803 and S804, a warning screen is displayed to prohibit data transfer when images are to be transmitted to the camera that is the transmission source of the images. On the other hand, as shown in FIG. 2, when the user changes the mode to a communication mode to transmit image data to another device, even if the device as a transmission destination is a transmission source device of the candidate image data to be transmitted, transmission is permitted.

Embodiment 4

Embodiment 4 will be described next.

In the present embodiment, when, as a result of an inquiry inquiring of the user as to transfer received image data that is made when image data has been received, an instruction to transfer the data is issued, if an external device brought in close proximity is a device to which the candidate image data to be transmitted was transferred in the past, transfer of the image data is prohibited.

Figure 10:
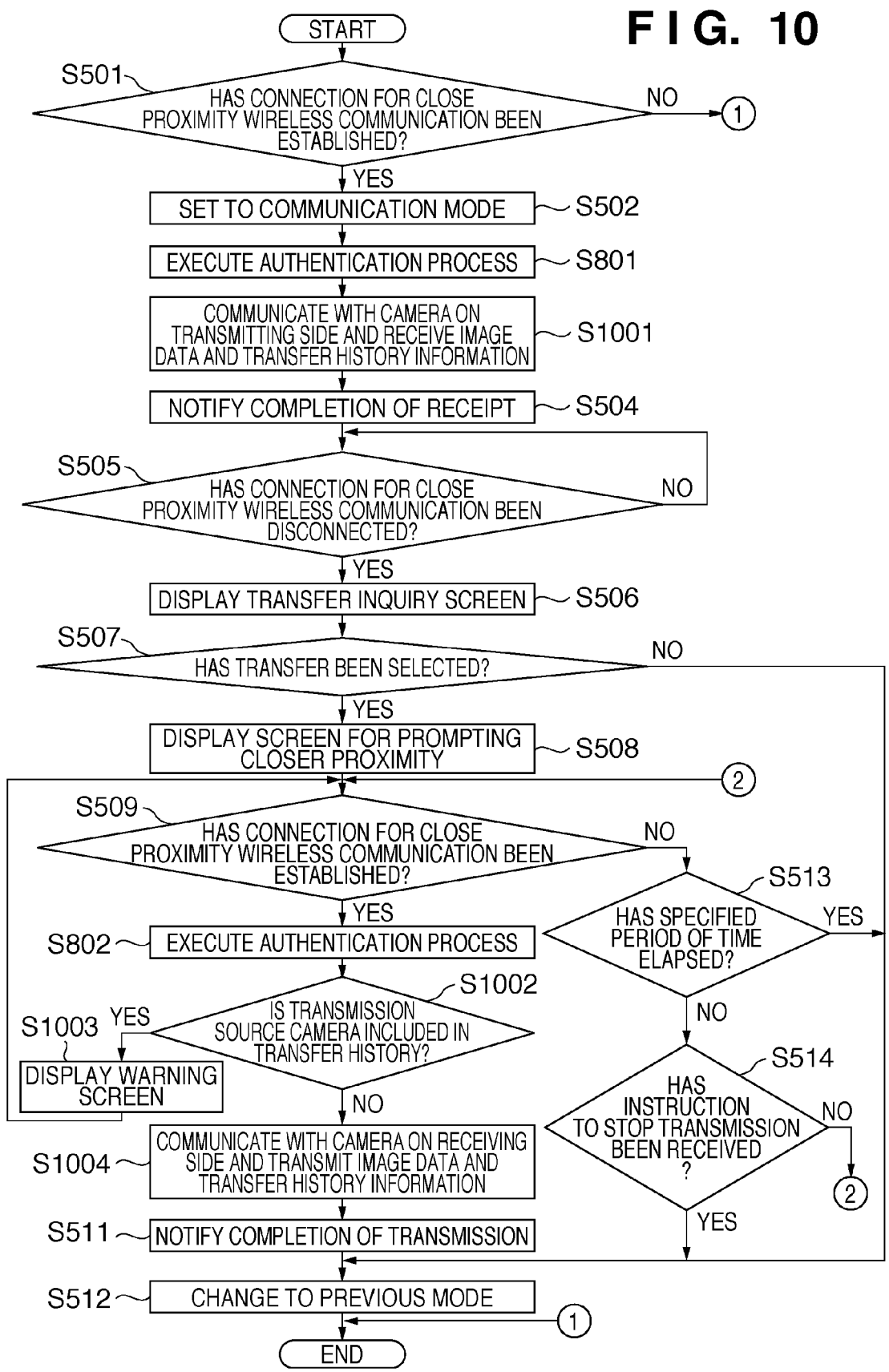
FIG. 10 is a flowchart illustrating a process performed by a digital camera according to Embodiment 4.

The system configuration and the configuration of the digital camera (101, 102, 103) of the present embodiment are the same as those of Embodiment 1, so a description thereof is omitted here. FIG. 10 is a flowchart illustrating a receiving process performed by the digital camera (101, 102, 103). The control unit 201 controlling each unit implements the process of FIG. 10. In FIG. 10, the same processes as those of FIG. 5 or 8 are given the same reference numerals as in FIG. 5 or 8, and a description thereof is omitted here.

Figures 11A, 11B, 11C:
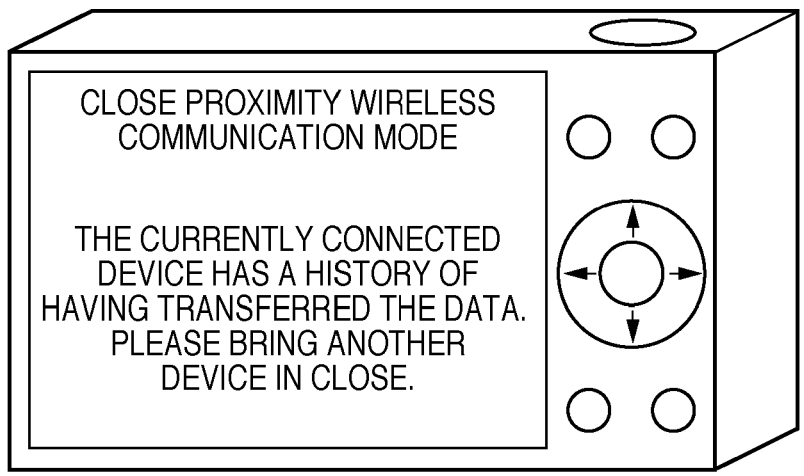
FIGS. 11A to 11C are diagrams showing examples of transfer history information and a warning screen according to Embodiment 4.

As shown in FIG. 10, if a connection for close proximity communication with a camera on the transmitting side is established (YES in S501), the control unit 201 sets the camera to a communication mode (S502). Then, the control unit 201 executes a device authentication process by using the close proximity communication unit 209. Next, the control unit 201 receives image data and transfer history information from the external device via the close proximity communication unit 209 (S1001). In the present embodiment, when transmitting image data, identification information regarding devices to which or in which the image data has been transmitted or stored in the past is transmitted. The transfer history information includes the device names and unique IDs of external devices to which each image data designated in the transmission request message as images to be transmitted was transferred in the past. FIG. 11A shows transfer history information received in S1001. It can be seen from FIG. 11A that one of the image data received in S1001 has a history of having been stored in four devices in total: Digital Video Camera A, Cell Phone A, Digital Camera C, and Digital Camera A. In the present embodiment, identification information regarding devices to which or in which the image data has been transmitted or stored through a capture process, the last n times (where n is an integer of 1 or greater), is transmitted as history information, rather than identification information regarding all of the devices to which the image data has been transferred in the past.

After the identification information has been received from the external device in this manner, the image data is received in the manner described above. Upon completion of receipt, the inquiry screen of FIG. 4D is displayed on the display unit 205. When an instruction to transfer the data is issued, the received image data is selected as images to be transmitted, and the display screen 402 of FIG. 4B is displayed on the display unit 205.

In this state, if an external device is brought in close proximity and a connection for close proximity communication is established, the control unit 201 executes the same device authentication process as in S801. Then, the control unit 201 determines whether or not the identification information acquired from a second external device in the device authentication process performed in S802 is included in the history information of all of the image data acquired from a first external device in S1001 (S1002). If it is determined that the transmission source camera is included in the history information, the control unit 201 displays, on the display unit 205, a warning screen indicating that the external device with which the close proximity connection has been established in S509 has received or held the image data received in S1001 in the past (S1003). Then, the control unit 201 returns to S509, and again waits for establishment of a close proximity connection with another external device. FIG. 11B shows an example of the warning screen displayed in S1003.

If it is determined in S1002 that the connected device is not included in the transfer history information of all of the received image, the control unit 201 transmits image data that was selected in S506 and in which the device connected in S509 is not included in the transfer history information (S1004). Here, the control unit 201 adds its own device name and unique ID to the transfer history information received in S1001. FIG. 11C shows an example of the transfer history information transmitted in S1004, in which the device named and unique ID of the digital camera B 102 have been added as No. 5.

In this manner, according to Embodiment 4, when the digital camera B 102 is in a waiting state for a close proximity connection to transmit image data that has been received from an external device to another external device, if a close proximity connection with an external device that has a history of having transferred the same image data in the past is established, a warning is issued to the user, whereby it is possible to avoid unnecessary transfer process.

Embodiments 1 to 4 have been described in the context where the present invention is applied to digital cameras, but the present invention is equally applicable to devices that can communicate with an external device.

In addition, with the present invention, a computer program can implement the same processes as those of the above-described embodiments. In this case, each of the constituent elements shown in FIG. 1 and the like can be caused to function by using a function or sub-routine executed by the CPU. In addition, usually, the computer program is stored in a computer-readable medium such as a CD-ROM, and the computer program can be made executable by loading the computer-readable medium to a reading apparatus (CD-ROM drive, etc.) of a computer and copying or installing the program to the system. Accordingly, it is obvious that such a computer-readable storage medium also falls within the scope of the present invention.

The present invention is not limited to the above embodiments and various changes and modifications can be made within the spirit and scope of the present invention. Therefore, to apprise the public of the scope of the present invention the following claims are made.

This application claims the benefit of Japanese Patent Application Nos. 2009-121352, filed on May 19, 2009 and 2010-090918, filed on Apr. 9, 2010, which are hereby incorporated by reference herein in their entireties.

What is claimed is:

1. A communication device which communicates with an external device, comprising:
    a communication unit configured to communicate with the external device;
    a control unit configured to set the mode of the communication device to one of a plurality of modes including a communication mode in which the communication unit communicates with the external device,
    wherein, in accordance that the communication unit receives data from a first external device in the communication mode, the control unit inquires of a user as to whether or not to transmit at least one of the received data to a second external device in a state in which the communication device has been set to the communication mode.

2. The device according to claim 1, further comprising: a detection unit configured to detect a disconnection of the communication by the communication unit,
    wherein in response to detection of a disconnection of the communication with the first external device by the detection unit after the communication unit receives data from the first external device, the control unit displays, on a display apparatus, an inquiry screen for prompting the user to select whether or not to transmit the data received from the first external device to the second external device.

3. The device according to claim 2, wherein the control unit determines whether or not transfer of the data received by the communication unit from the first external device has been permitted, displays the inquiry screen if it is determined that transfer has been permitted, and changes the communication device from the communication mode to another mode if it is determined that transfer has not been permitted.

4. The device according to claim 1, wherein the control unit determines whether or not identification information received by the communication unit from the first external device matches identification information received by the communication unit from the second external device, and issues a warning if it is determined that the identification information of the first external device and the identification information of the second external device match.

5. The device according to claim 1, wherein the communication unit receives, from the first external device, history information that shows devices that have received or held the data received from the first external device, and
    the control unit determines whether or not the identification information of the second external device received by the communication unit from the second external device is included in the history information regarding the data received from the first external device, and issues a warning if it is determined that the identification information of the second external device is included in the history information.

6. The device according to claim 1, further comprising: a storage medium control unit configured to store data received by the communication unit in a storage medium and reads the data from the storage medium.

7. The device according to claim 1, wherein the control unit controls the communication unit to transmit the received data to the second external device in the state in which the communication device has been set to the communication mode if an instruction to transmit the received data is issued as a result of the inquiry, and to change the communication device from the communication mode to another mode if an instruction to transmit the received data is not issued.

8. The device according to claim 7, wherein the control unit controls the communication unit to transmit the received data to the second external device in the state in which the communication device has been set to the communication mode if an instruction to transmit the received data is issued as a result of the inquiry, and to automatically change the communication device from the communication mode to another mode if transmission of the data to the second external device is complete.

9. The device according to claim 1, wherein the communication unit communicates with the external device via close proximity wireless communication.

10. The device according to claim 9, wherein when the communication mode is set by the user, the control unit displays, on a display apparatus, a screen for prompting the user to set the close proximity wireless communication, and when it is detected that the proximity wireless communication has been established, the control unit controls the communication unit to transmit the received data.

11. The device according to claim 9, wherein the control unit automatically sets the communication device to the communication mode when the communication unit detects that the external device is in close proximity.

12. The device according to claim 1, wherein the data is image data.

13. A method of controlling a communication device comprising a communication unit configured to communicate with an external device, wherein the communication unit has a plurality of modes including a communication mode for communicating with the external device, the method comprising:
in accordance that data by the communication unit from a first external device in the communication mode is received, inquiring of a user as to whether or not to transmit at least one of the received data to a second external device in a state in which the communication device has been set to the communication mode.

14. A communication device which communicates with an external device, comprising:
a communication unit configured to communicate with the external device;
a mode setting unit configured to set a communication mode in which the communication unit communicates with the external device from among a plurality of modes;
a selection unit configured to select data to be transmitted to the external device; and
a control unit configured to control the communication unit to transmit the data selected by the selection unit to the external device,
wherein, in accordance that the communication unit transmits the selected data to the external device in the communication mode, the control unit inquires of a user as to whether or not to transmit at least one of the selected data to another external device in a state in which the communication device has been set to the communication mode.

15. The device according to claim 14, wherein the data is image data.

16. The device according to claim 14, wherein the communication unit communicates via close proximity wireless communication, and the control unit controls the communication unit to transmit the selected data when, in the communication mode, the communication unit enters a state in which the communication unit can communicate via the close proximity wireless communication.

17. The device according to claim 16, wherein when the communication mode is set by the user, the control unit displays, on a display apparatus, a screen for prompting the user to set the close proximity wireless communication, and when it is detected that the proximity wireless communication has been established, the control unit controls the communication unit to transmit the selected data.

18. A method of controlling a communication device comprising a communication unit configured to communicate with an external device, a mode setting unit configured to set a communication mode in which the communication unit communicates with the external device from among a plurality of modes, and a selection unit configured to select data to be transmitted to the external device, the method comprising:
in accordance that the selected data to the external device by the communication unit in the communication mode is transmitted, inquiring of a user as to whether or not to transmit at least one of the selected data to another external device in a state in which the communication device has been set to the communication mode.

* * * * *